US007665199B2

(12) United States Patent
Metcalf

(10) Patent No.: US 7,665,199 B2
(45) Date of Patent: Feb. 23, 2010

(54) METHOD OF MAKING A RAZOR BLADE UNIT

(75) Inventor: Stephen Cabot Metcalf, Newton, MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 12/009,944

(22) Filed: Jan. 23, 2008

(65) Prior Publication Data

US 2009/0183352 A1 Jul. 23, 2009

(51) Int. Cl.
*B26B 21/00* (2006.01)
*B23P 11/00* (2006.01)

(52) U.S. Cl. ................................ 29/428; 29/525; 30/50

(58) Field of Classification Search .................. 29/428, 29/453, 520, 521, 525.13, 525.15; 30/50
See application file for complete search history.

(56) References Cited

U.S. PATENT DOCUMENTS 5,063,668 A 11/1991 Althaus
5,161,307 A 11/1992 Althaus
5,253,420 A 10/1993 Althaus et al.
6,115,902 A * 9/2000 Garland et al. ................ 29/417
6,145,201 A 11/2000 Andrews
6,584,690 B2 7/2003 Orloff et al.
7,100,284 B2 * 9/2006 King ............................ 30/49
7,127,817 B2 10/2006 Orloff et al.
2003/0014866 A1 * 1/2003 Orloff et al. .................. 30/41
2007/0006464 A1 1/2007 Bunnell et al.

FOREIGN PATENT DOCUMENTS

GB 2 413 980 A 11/2005
WO WO 95/28259 10/1995
WO WO 96/30176 10/1996
WO WO 2006/041885 A1 4/2006
WO WO 2007/033373 3/2007

* cited by examiner

*Primary Examiner*—Jermie E Cozart
(74) *Attorney, Agent, or Firm*—John M. Lipchitz; Kevin C. Johnson; Steven W. Miller

(57) ABSTRACT

A method of making a razor blade unit is provided. The method includes the steps of: providing a plastic base member; providing a plastic upper member, the plastic upper member having a first surface and an opening in the first surface; securing a shaving aid member to the first surface of the upper member, the shaving aid completely surrounding the opening; inserting at least one razor blade between the plastic base member and the plastic upper member; and securing the plastic base member to the plastic upper member creating a plastic body having the at least one razor blade disposed in the plastic body.

7 Claims, 5 Drawing Sheets

METHOD OF MAKING A RAZOR BLADE UNIT

FIELD OF THE INVENTION

The present invention is directed to a method of making a razor blade unit.

BACKGROUND OF THE INVENTION

Various embodiments of wet or safety razors are known. In each case, disposed at the front end of a handle is a razor blade unit that carries the razor blade(s). The razor blade unit can be integrally formed with the handle as a molded plastic part. Alternatively, the razor blade unit may be separate from the handle and be secured thereto in an exchangeable manner via an appropriate mechanism.

Various embodiments of razor blade units are known. Basically, a plastic body is provided in which razor blade(s) are encased.

The skin contacting portion of the plastic body typically has a shaving aid member or lubrication strip provided in the rear region behind the razor blade(s). The shaving aid member or lubrication strip helps reduce friction between the razor blade unit and the skin of the user during shaving providing an improved shave.

Although the known shaving aid members or lubrication strips reduce friction between the razor blade unit and the skin of a user and thus to some extent provide an improved shave, further improvements in reducing friction between the razor blade unit and the skin of the user are desired.

It is therefore an object of the present invention to provide a method of making a razor blade unit, of a wet razor of the aforementioned general type whereby an improved shaving aid member is provided and hence an improved gliding condition is provided.

SUMMARY OF THE INVENTION

In accordance with the present invention a method of making a razor blade unit is provided. The method comprises the steps of: providing a plastic base member; providing a plastic upper member, the plastic upper member having a first surface and an opening in the first surface; securing a shaving aid member to the first surface, the shaving aid member completely surrounding the opening; inserting at least one razor blade between the plastic base member and the plastic upper member; and securing the plastic base member to the plastic upper member creating a plastic body having the at least one razor blade disposed in the plastic body.

The shaving aid member may be secured to the first surface by molding, gluing, or friction fitting.

The razor blade may be secured to a support member prior to being inserted between the plastic base member and the plastic upper member. The at least one razor blade may be secured to the support member by a wire or filament.

The plastic base member and plastic upper member may be provided by molding.

The plastic base member may be secured to the plastic upper member by gluing or friction fitting.

The plastic upper member may have a groove in the first surface which completely surrounds the opening in the first surface. The shaving aid member may be secured within the groove by molding, gluing, or friction fitting.

BRIEF DESCRIPTION OF THE DRAWINGS

While the specification concludes with claims particularly pointing out and distinctly claiming the subject matter which is regarded as forming the present invention, it is believed that the invention will be better understood from the following description taken in conjunction with the accompanying drawings.

DETAILED DESCRIPTION OF THE INVENTION

Figure 1:
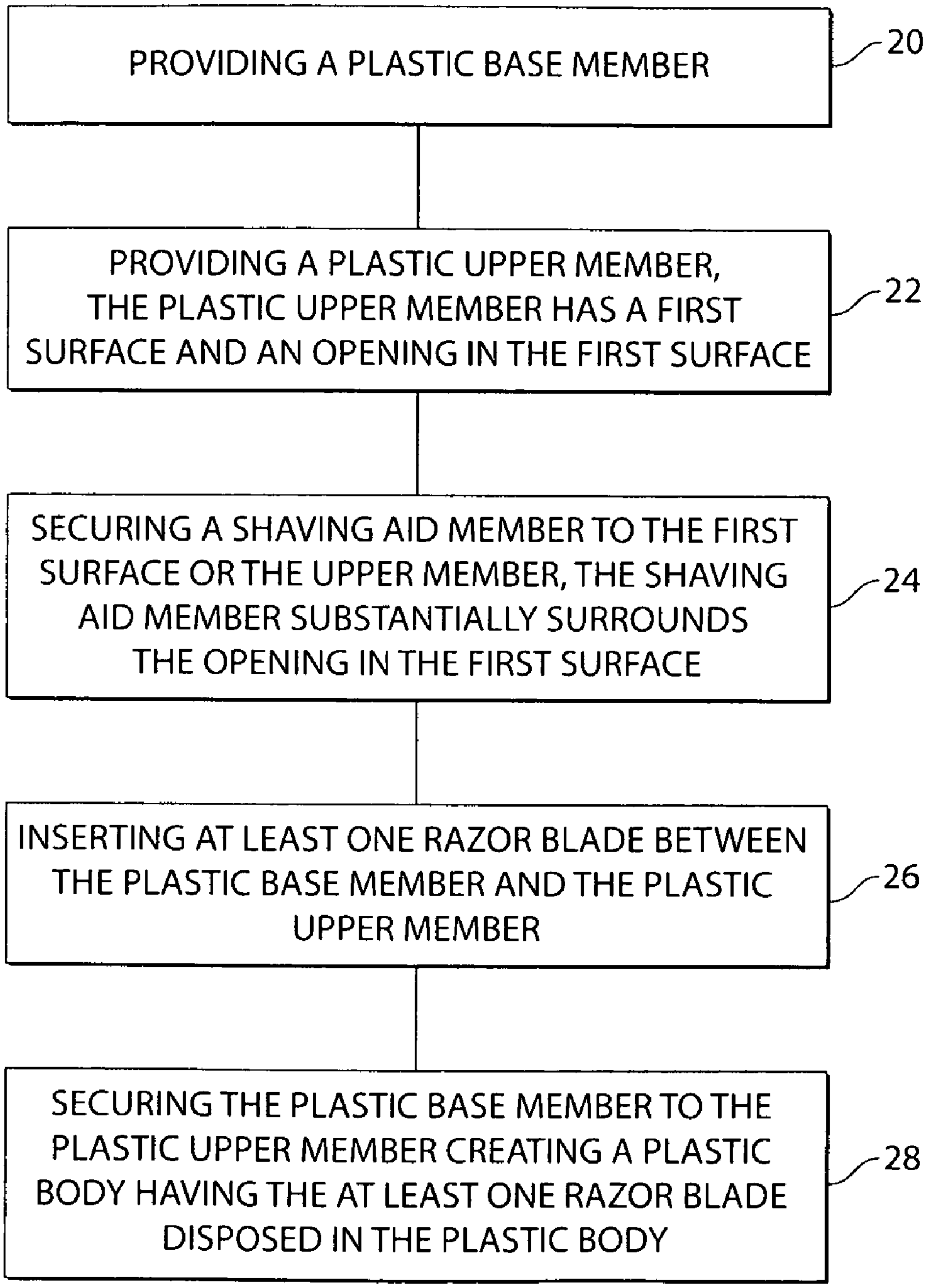
FIG. 1 is a flow chart showing a method for making a razor blade unit of the present invention.

Referring now to FIG. 1, there is shown a method for making a razor blade unit in accordance with the present invention. Rectangular blocks represent execution of a step. The method begins at block 20. In block 20, a plastic base member is provided. The plastic base member may be provided by molding, such as injection molding. In block 22 a plastic upper member is provided. The plastic upper member may be provided by molding, such as injection molding. The plastic upper member has a first surface and an opening in the first surface. The opening provides access to the razor blades to be provided later. In block 24, a shaving aid member is secured to the first surface of the upper member. The shaving aid member may be secured to the first surface by molding, gluing, or friction fitting. The shaving aid member completely surrounds the opening in the first surface. Preferably, the plastic upper member has a groove in the first surface in which the shaving aid member is secured by any of the aforementioned methods. In block 26, at least one razor blade is inserted between the plastic base member and the plastic upper member. The razor blade may be secured to a support member prior to being inserted between the plastic base member and the plastic upper member. The at least one razor blade may be secured to the support member by a wire or filament. In block 28, the plastic base member is secured to the plastic upper member creating a plastic body having the at least one razor blade disposed in the plastic body. The plastic base member may be secured to the plastic upper member by gluing or friction fitting.

Figure 2:
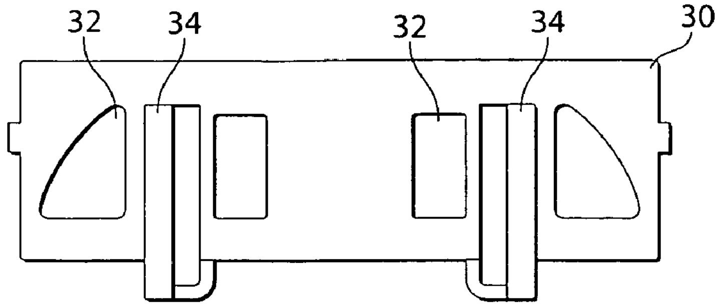
FIG. 2 is a top plan view of a plastic base member.

Referring now to FIG. 2 there is shown a plastic base member 30 that is to be provided according to block 20 of FIG. 1. The plastic base member 30 is preferably provided by molding, such as injection molding. The plastic base member 30 is provided with through slots 32 that are primarily disposed in the interior thereof. The plastic base member 30 can be secured to the front end of a non-illustrated handle via channels 34. Other well known structures may also be utilized for securing the plastic base member 30 to a handle.

Figure 3:
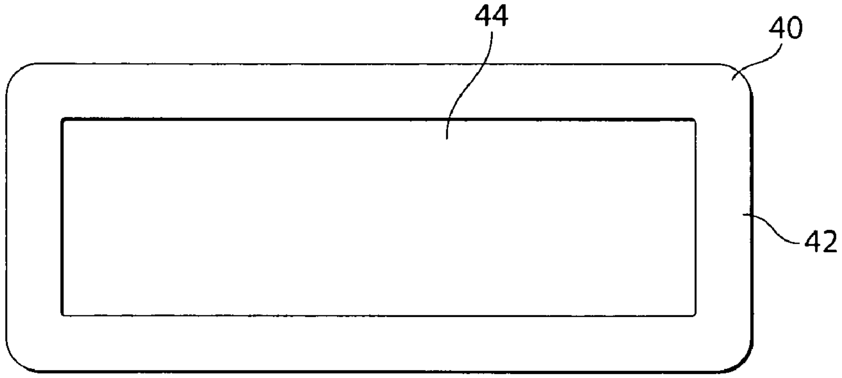
FIG. 3 is a top plan view of a plastic upper member.

Referring now to FIG. 3 there is shown a plastic upper member 40 that is to be provided according to block 22 of FIG. 1. The plastic upper member 40 is preferably provided by molding, such as injection molding. The plastic upper member 40 has a first surface 42 and an opening 44 in the first surface 42. The opening 44 provides access to the razor blade(s). The first surface 42 is the surface of plastic upper member 40 that faces the user during shaving. Thus, the first surface 42 may also be referred to as the skin contacting surface of plastic upper member 40.

Figure 4:
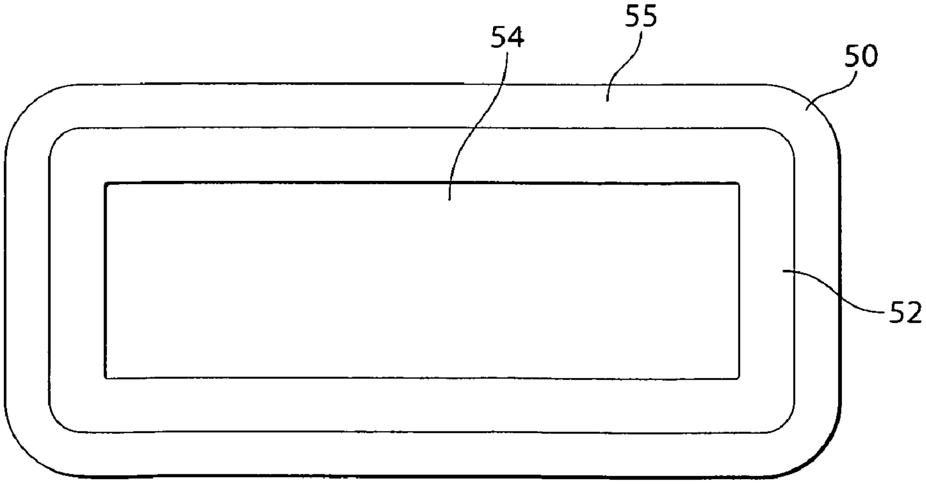
FIG. 4 is a top plan view of another plastic upper member.

Referring now to FIG. 4 there is shown another plastic upper member 50 that is to be provided according to block 22 of FIG. 1. The plastic upper member 50 is preferably provided by molding, such as injection molding. The plastic upper member 50 has a first or skin contacting surface 52 and an opening 54 in the first surface 52. The opening 54 provides access to the razor blade(s). The first surface 52 has a groove or channel that 55 completely surrounds the opening 54.

Figure 5:
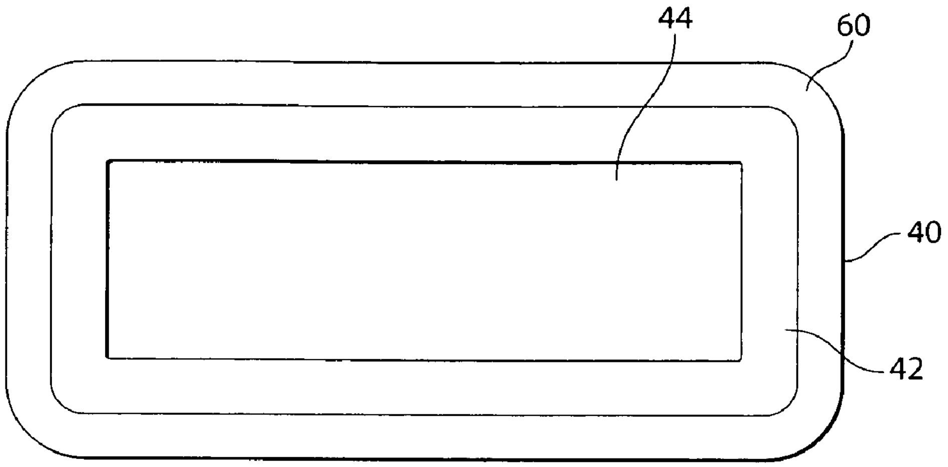
FIG. 5 is a top plan view of the plastic upper member of FIG. 3 with a shaving aid secured to the first surface.
Figure 6:
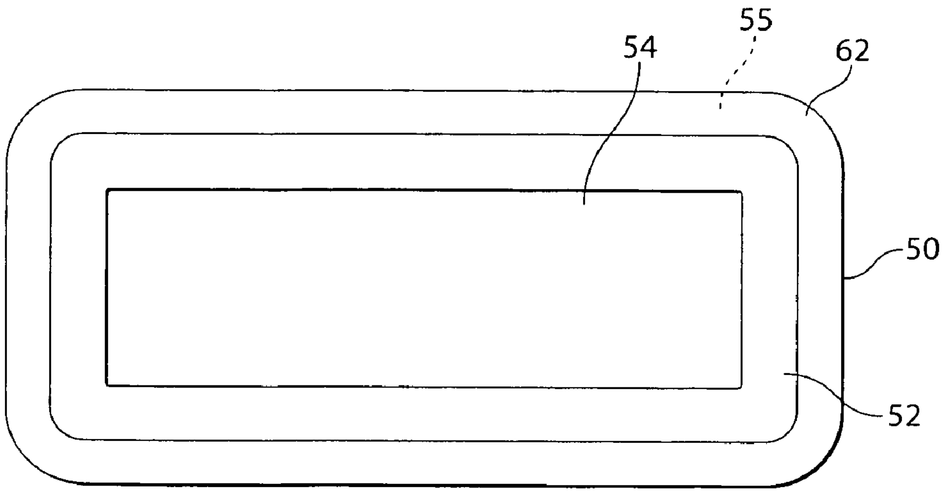
FIG. 6 is a top plan view of the plastic upper member of FIG. 4 with a shaving aid secured within the groove in the first surface.

Referring now to FIG. 5, a shaving aid member 60 is shown secured to the first surface 42 of the plastic upper member 40 according to block 24 of FIG. 1. The shaving aid member 60 may be secured to the first surface 42 by molding, gluing, or friction fitting. The shaving aid member 60 completely surrounds the opening 44 in the first surface 42. Referring now to FIG. 6, a shaving aid member 62 is shown secured in groove 55 in the first surface 52 of the plastic upper member 50 according to block 24 of FIG. 1. The shaving aid member 62 may be secured in groove 55 by molding, gluing, or friction fitting. The shaving aid member 62 completely surrounds the opening 54 in the first surface 52. The shaving aid member 60, 62 preferably has lubricating properties, but it may have, either alternatively or in addition, other properties, e.g., moisturizing properties considered beneficial during shaving. The shaving aid member 60, 62 will have adequate leaching properties allowing it to be dispensed during shaving, e.g. upon being made more fluid by contact with water, when the skin contacting surface slides over the skin during shaving.

The shaving aid member 60, 62 preferably comprises a water-soluble shaving aid mixed with a non-water-soluble material to form an insoluble polymer/soluble shaving aid composite. Upon exposure to water, the water-soluble shaving aid leaches from the composite onto the skin. Suitable water-insoluble matrix materials include, for example, polyethylene, polypropylene, polystyrene and polyacetyl. Suitable water-soluble shaving aid materials include, for example, polyethylene oxide, polyvinyl pyrrolidone, polyacrylamide, hydroxypropyl cellulose, polyvinyl imidazonline, polyhydroxyethylmethacrylate, silicone copolymers, sucrose stearate, vitamin E, panthenol, aloe and essential oils such as menthol.

The shaving aid member may also comprise a release-enhancing agent. Suitable release-enhancing agents include, for example, polyethylene glycol, methoxypolyethylene glycol, methylcellulose, and carboxypolymethylene.

Figure 7:
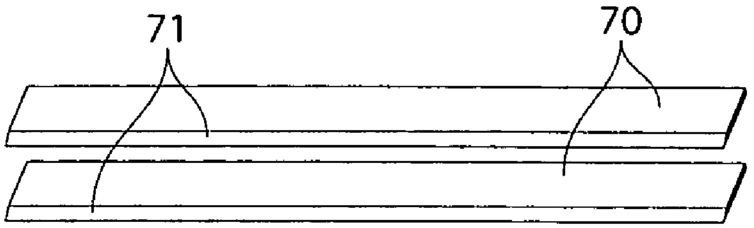
FIG. 7 is a top plan view of razor blades to be inserted between the base member and the upper member.

Referring now to FIG. 7 there is shown razor blades 70 to be inserted between plastic base member and plastic upper member according to block 26 of FIG. 1. Razor blades 70 have cutting edges 71.

Figure 8:
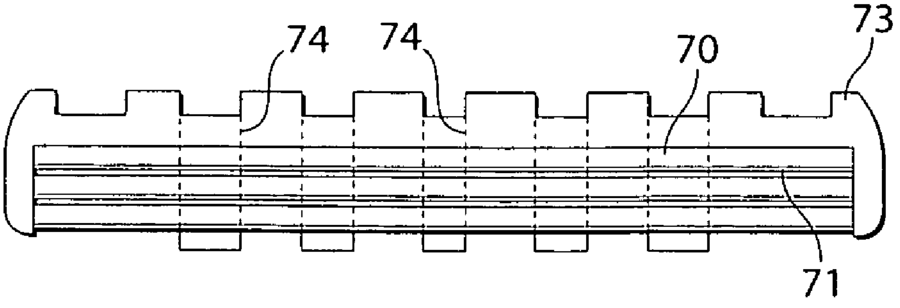
FIG. 8 is a top plan view of razor blades to be inserted between the base member and the upper member secured to a support member.

Referring now to FIG. 8, the razor blades 70 with cutting edges 71 may be secured to support member 73 prior to being inserted between plastic base member and plastic upper member. The blades 70 are shown secured to support member 73 with a wire or filament 74. Alternatively, the blades 70 may be secured to support member 73 via adhesive or other known techniques. An example of blades being secured to a support member via a wire or filament is shown in U.S. Pat. No. 5,161,307 issued to Althaus on Nov. 10, 1992.

Figure 9:
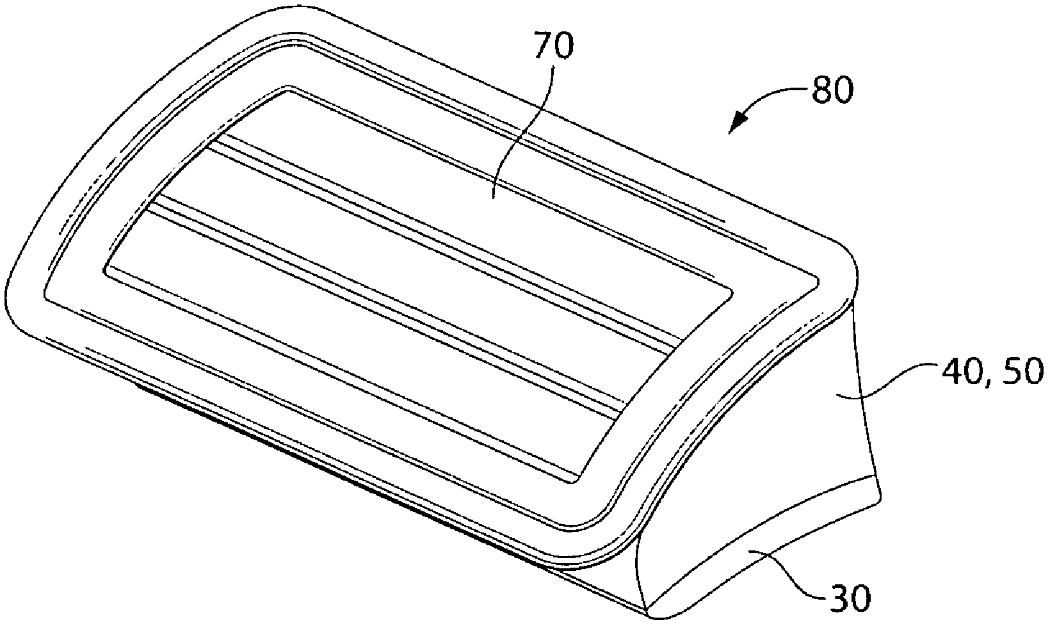
FIG. 9 is a perspective view of a plastic body.

Referring now to FIG. 9 there is shown plastic body 80. Plastic body 80 having razor blades 70 disposed therein is formed by securing plastic base member 30 to plastic upper member 40, 50 according to block 28 of FIG. 1. The razor blades 70 may be inserted directly between the plastic base member 30 and the plastic upper member 40, 50. Alternatively, the razor blades 70 may be secured to a support member such as support member 73, shown in FIG. 8, prior to being inserted between the plastic base member 30 and the plastic upper member 40, 50. The plastic base member may be secured to the plastic upper member by gluing or friction fitting.

The razor blades may be fixedly disposed in the plastic body. Alternatively, the razor blades may be moveably disposed in the plastic body. An example of moveable razor blades disposed in a cartridge is shown in WO 2007/033373 A1 published Mar. 22, 2007 filed in the name of Richard et al.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of making a razor blade unit, said method comprising the steps of:

providing a plastic base member;

providing a plastic upper member, said plastic upper member having a first surface, an opening in said first surface and a groove in said first surface completely surrounding said opening;

securing a shaving aid member within said groove;

inserting at least one razor blade between said plastic base member and said plastic upper member, wherein the opening extends through the first surface to provide access to the at least one razor blade; and securing said plastic base member to said plastic upper member creating a plastic body having the at least one razor blade disposed in said plastic body.

2. The method of claim 1 wherein said shaving aid member is secured within said groove by molding, gluing, or friction fitting.

3. The method of claim 1 wherein said at least one razor blade is secured to a support member prior to being inserted between said plastic base member and said plastic upper member.

4. The method of claim 3 wherein said at least one razor blade is secured to said support member by a wire or filament.

5. The method of claim 1 wherein said plastic base member is provided by molding.

6. The method of claim 1 wherein said plastic upper member is provided by molding.

7. The method of claim 1 wherein said plastic base member is secured to said plastic upper member by gluing or friction fitting.

* * * * *